US006374603B1

(12) United States Patent
Morita et al.

(10) Patent No.: US 6,374,603 B1
(45) Date of Patent: Apr. 23, 2002

(54) HYDRAULIC CIRCUITS FOR INTERNAL COMBUSTION ENGINES

(75) Inventors: Shoji Morita; Takehisa Kondoh; Yasushi Watanabe, all of Kanagawa (JP)

(73) Assignee: Unisia JECS Corporation, Atsugi (JP)

(*) Notice: Subject to any disclaimer, the term of this patent is extended or adjusted under 35 U.S.C. 154(b) by 0 days.

(21) Appl. No.: 09/366,702

(22) Filed: Aug. 2, 1999

(30) Foreign Application Priority Data

Aug. 3, 1998 (JP) .......................................... 10-219408

(51) Int. Cl.$^{7}$ ................................................ F16D 31/02

(52) U.S. Cl. ............................. 60/421; 60/486; 60/494; 60/454

(58) Field of Search .......................... 60/421, 422, 486, 60/468, 459, 494

(56) References Cited

U.S. PATENT DOCUMENTS

| | | | | | |
|---|---|---|---|---|---|
| 2,643,516 | A | * | 6/1953 | Carlson | 60/421 X |
| 3,575,000 | A | * | 4/1971 | Hufeld et al. | 60/422 |
| 3,945,208 | A | * | 3/1976 | O'Connor | 60/486 X |
| 3,975,909 | A | * | 8/1976 | McBurnett | 60/421 |
| 4,023,466 | A | * | 5/1977 | Strassheimer | 60/486 X |
| 4,400,938 | A | * | 8/1983 | Ohe | 60/429 X |
| 4,516,467 | A | * | 5/1985 | Keeney et al. | 60/421 X |
| 4,635,439 | A | * | 1/1987 | Wible | 60/421 X |
| 4,779,416 | A | * | 10/1988 | Chatterjea et al. | 60/429 |
| 5,148,676 | A | * | 9/1992 | Moriya et al. | 60/422 X |
| 5,547,349 | A | | 8/1996 | Kimura et al. | |
| 5,615,553 | A | * | 4/1997 | Lourigan | 60/422 |
| 5,950,431 | A | * | 9/1999 | Oogushi | 60/468 |

FOREIGN PATENT DOCUMENTS

| | | |
|---|---|---|
| DE | 30 16 943 | 11/1981 |
| GB | 940 909 | 11/1963 |
| GB | 1 325 022 | 8/1973 |
| JP | 4-175431 | 6/1992 |

* cited by examiner

*Primary Examiner*—John E. Ryznic
(74) *Attorney, Agent, or Firm*—Foley & Lardner

(57) ABSTRACT

A hydraulic circuit includes first and second pumps, a first discharge passage receiving hydraulic fluid discharged from the first pump and communicating with a main gallery, a second discharge passage receiving hydraulic fluid discharged from the second pump and communicating with an actuator, a communication passage ensuring communication between the first and second discharge passages, and a relief valve arranged with the communication passage to be opened at a predetermined pressure for the second discharge passage.

14 Claims, 3 Drawing Sheets

HYDRAULIC CIRCUITS FOR INTERNAL COMBUSTION ENGINES

BACKGROUND OF THE INVENTION

The present invention relates to hydraulic circuits for supplying hydraulic fluid to slide portions and valve controllers of internal combustion engines.

One of the hydraulic circuits is disclosed, for example, in JP-A 4-175431. This hydraulic circuit includes first and second hydraulic pumps arranged independently. The first pump sucks hydraulic fluid within an oil pan to discharge it to a first discharge passage that communicates with a main gallery, whereas the second hydraulic pump sucks hydraulic fluid within the discharge passage to discharge it to a second discharge passage that communicates with a valve controller.

Connected to each discharge passage is a relief passage communicating with the oil pan and having a relief valve for opening the relief passage at a predetermined pressure. The relief valve serves to maintain the pressure within the corresponding discharge passage at a predetermined value.

Specifically, connected to the first discharge passage is the first relief passage communicating with the oil pan and having the first relief valve for opening the first relief passage at a predetermined pressure for the first discharge passage. The first relief valve carries out relief action to maintain the pressure within the first discharge passage at a predetermined value. Connected to the second discharge passage is the second relief passage communicating with the oil pan and having the second relief valve for opening the second relief passage at a predetermined pressure for the second discharge passage. The second relief valve carries out relief action to maintain the pressure within the second discharge passage at a predetermined value.

Hydraulic fluid discharged to the first discharge passage is supplied, through the main gallery, to the slide portions for lubrication thereof. On the other hand, hydraulic fluid discharged to the second discharge passage is supplied to the valve controller for operation thereof.

With the known hydraulic circuit, however, in view of the fact that the first relief passage connected to the first discharge passage communicates with the oil pan, and the second relief passage connected to the second discharge passage also communicates with the oil pan, the first hydraulic pump needs a discharge capacity Q1 required to lubricate the slide portions, and the second hydraulic pump needs a discharge capacity Q2 required to operate the valve controller.

The valve controller is operated under a predetermined operating condition of the internal combustion engine, and is not operated in the normal operating condition thereof. And the pressure within the second discharge passage is maintained at a predetermined value by relief action of the second relief valve. Specifically, the second hydraulic pump always discharges the quantity Q2 of hydraulic fluid required to operate the valve controller, while when the valve controller is not operated, the second relief valve is opened to ensure hydraulic circulation to the oil pan.

Therefore, when the valve controller is not operated, the second hydraulic pump carries out needless work of circulating hydraulic fluid within the second discharge passage to the oil pan, resulting in a waste of power.

It is, therefore, an object of the present invention to provide hydraulic circuits for internal combustion engines, which include hydraulic pumps with saved power and reduced size.

SUMMARY OF THE INVENTION

One aspect of the present invention lies in providing a hydraulic circuit, comprising:

first and second pumps;

a first discharge passage receiving hydraulic fluid discharged from said first pump, said first discharge passage communicating with a main gallery; a second discharge passage receiving hydraulic fluid discharged from said second pump, said second discharge passage communicating with an actuator;

a communication passage ensuring communication between said first and second discharge passages; and a relief valve arranged with said communication passage, said relief valve being opened at a predetermined pressure for said second discharge passage.

Another aspect of the present invention lies in providing a hydraulic circuit, comprising:

a pump with first and second ports;

a first discharge passage receiving hydraulic fluid discharged through said first port of said pump, said first discharge passage communicating with a main gallery;

a second discharge passage receiving hydraulic fluid discharged from said second port, said second discharge passage communicating with an actuator;

a communication passage ensuring communication between said first and second discharge passages; and a relief valve arranged with said communication passage, said relief valve being opened at a predetermined pressure for said second discharge passage.

DETAILED DESCRIPTION OF THE INVENTION

Figure 1:
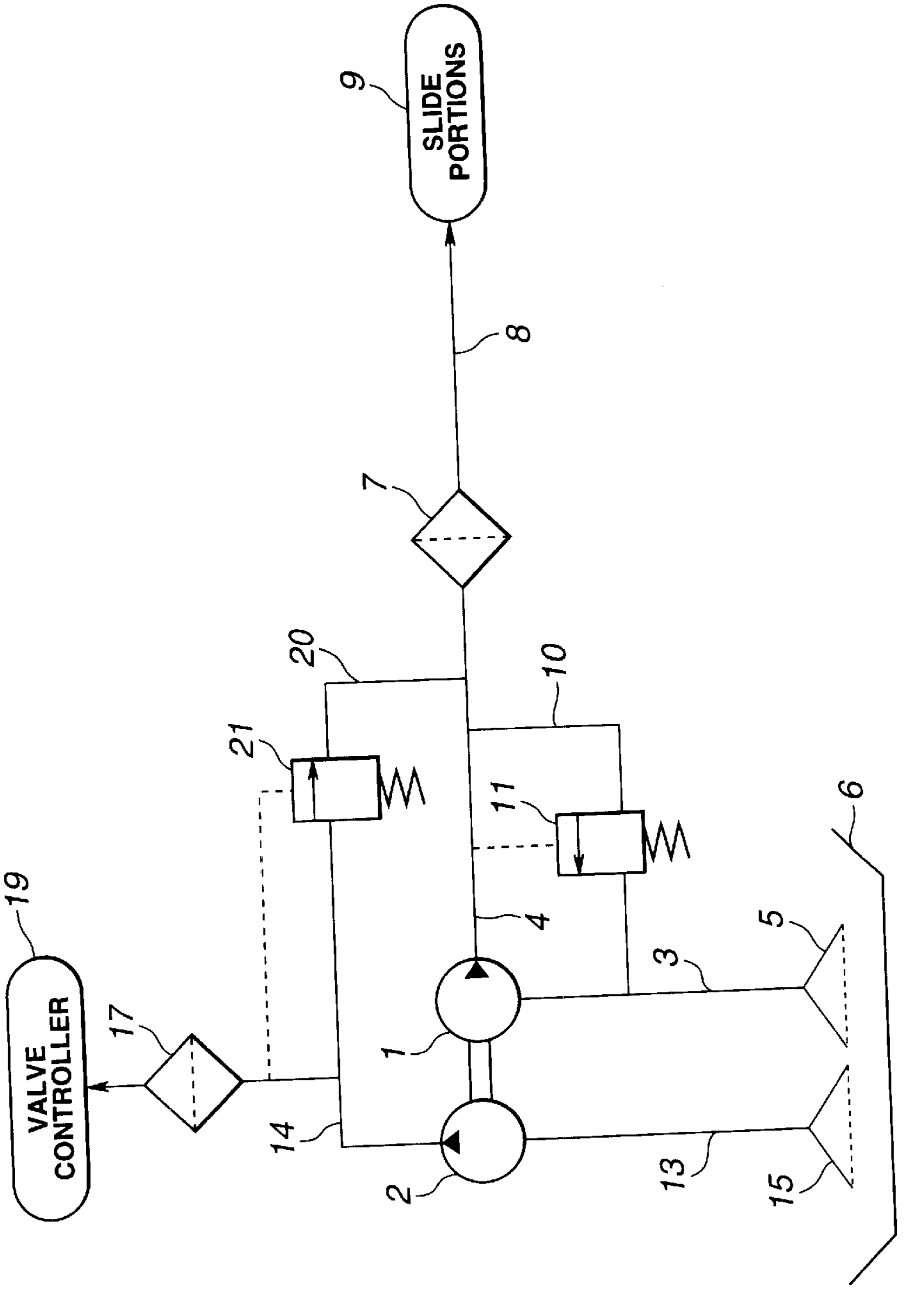
FIG. 1 is a block diagram showing a first embodiment of a hydraulic circuit for an internal combustion engine according to the present invention.

Referring to the drawings, a description will be made with regard to a hydraulic circuit for an internal combustion engine embodying the present invention.

FIG. 1 shows a first embodiment of the present invention. Referring to FIG. 1, the hydraulic circuit comprises a first hydraulic pump 1 and a second hydraulic pump 2, which are arranged independently and driven singly or together by operation of the internal combustion engine, not shown.

A first intake passage 3 and a first discharge passage 4 are arranged for the first hydraulic pump 1. The first intake passage 3 has an end with an oil strainer 5 to communicate with an oil pan 6. By those, the first hydraulic pump 1 can suck hydraulic fluid within the oil pan 6 through the first intake passage 3 to discharge it to the first discharge passage 4.

The first discharge passage 4 communicates with a main gallery 8 through a filter 7. Hydraulic fluid led to the main gallery 8 is supplied to slide portions 9 of the internal combustion engine for lubrication thereof.

A communication passage 10 ensures communication between the first intake passage 3 and the first discharge passage 4. A relief valve 11 is arranged with the communication passage 10 to open it at a predetermined pressure for the first discharge passage 4. Thus, the pressure within the first discharge passage 4 is maintained at a predetermined value by relief action of the relief valve 11.

A second intake passage 13 and a second discharge passage 14 are arranged for the second hydraulic pump 2. The second intake passage 13 has an end with an oil strainer 15 to communicate with the oil pan 6. By those, the second hydraulic pump 2 can suck hydraulic fluid within the oil pan 6 through the second intake passage 13 to discharge it to the second discharge passage 14.

The second discharge passage 14 communicates with a valve controller 19 of the internal combustion engine through a filter 17. Hydraulic fluid supplied to the valve controller 19 serves to ensure operation thereof.

A communication passage 20 ensures communication between the second discharge passage 14 and the first discharge passage 4. A relief valve 21 is arranged with the communication passage 20 to open it at a predetermined pressure for the second discharge passage 14. Thus, the pressure within the second discharge passage 14 is maintained at a predetermined value by relief action of the relief valve 21.

With such a structure, the first and second hydraulic pumps 1, 2 are driven by operation of the internal combustion engine. The first hydraulic pump 1 sucks hydraulic fluid within the oil pan 6 through the first intake passage 3 to discharge it to the first discharge passage 4. Hydraulic fluid discharged to the first discharge passage 4 is led to the main gallery 8 through the filter 7, which is in turn supplied to the slide portions 9 for lubrication thereof. On the other hand, the second hydraulic pump 2 sucks hydraulic fluid within the oil pan 6 through the second intake passage 13 to discharge it to the second discharge passage 14, which is in turn supplied to the valve controller 19 through the filter 17 for operation thereof.

When the valve controller 19 is not operated, hydraulic fluid discharged from the second hydraulic pump 2 to the second discharge passage 14 flows into the first discharge passage 4 through the communication passage 20 due to relief action of the relief valve 21.

Thus, the first discharge passage 4 receives a predetermined flow Q1 of hydraulic fluid discharged from the first hydraulic pump 1 and a flow Qa of hydraulic fluid derived from the second discharge passage 14 through the communication passage 20, i.e., a total flow Qt=Q1+Qa. It is noted that when the valve controller 19 is not operated, the flow Qa that the first discharge passage 4 receives through the second discharge passage 14 is substantially equal to a discharge capacity Q2 of the second hydraulic pump 2, since an actuator of the valve controller 19 substantially constitutes a closed circuit.

As a result, hydraulic fluid supplied to the slide portions 9 through the first discharge passage 4 and the main gallery 8 amounts to Qt. It is understood that when the valve controller 19 is not operated, hydraulic fluid discharged from the second hydraulic pump 2 is led to the first discharge passage 4, which means that the second hydraulic pump 2 does not carry out needless work.

Moreover, the first hydraulic pump 1 only needs a discharge capacity corresponding to the quantity obtained by subtracting the inflow Qa from the quantity Q1 required to lubricate the slide portions 9, resulting in a reduced size of the first hydraulic pump 1.

When the valve controller 19 is operated, hydraulic fluid discharged from the second hydraulic pump 2 serves to operate the valve controller 19, which causes a temporary reduction in the flow of hydraulic fluid led to the first discharge passage 4. However, this does not have a substantial influence on lubrication of the slide portions 9, since the operation of the valve controller 19 is completed in a very short time, and the pressure within the first discharge passage 4 returns to a normal value in a short time.

Therefore, the hydraulic circuit can be obtained, which includes the hydraulic pumps with saved power and reduced size.

Moreover, the filters 7, 17 arranged in the first and second discharge passages 4, 14 serve to filtrate hydraulic fluid, enabling a supply of clean hydraulic fluid to the slide portions 9 and the valve controller 19.

Figure 2:
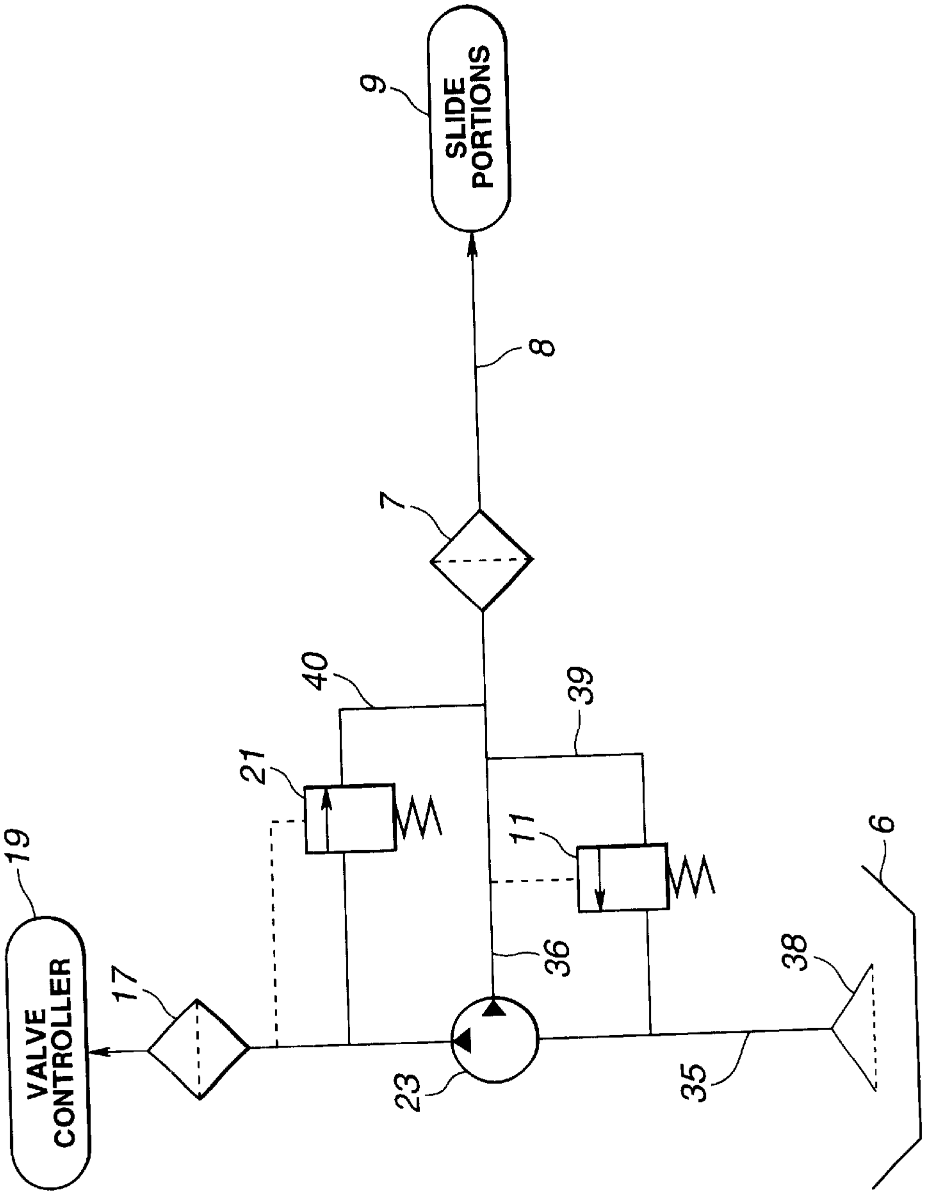
FIG. 2 is a view similar to FIG. 1, showing a second embodiment of the present invention.
Figure 3:
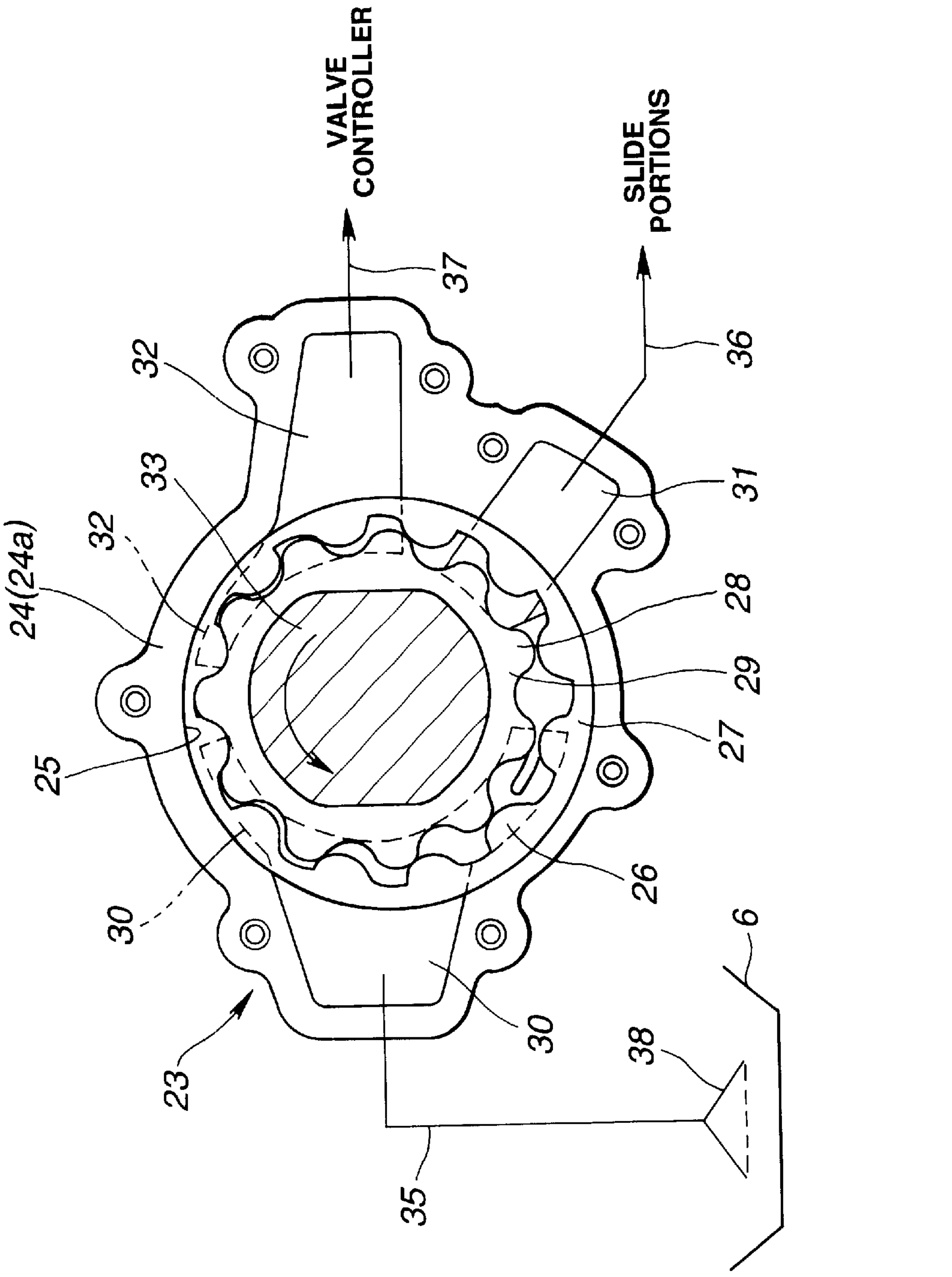
FIG. 3 is a cross section showing a hydraulic pump shown in FIG. 2.

FIGS. 2–3 show a second embodiment of the present invention. Referring particularly to FIG. 2, the hydraulic circuit comprises a hydraulic pump 23 having two discharge ports as will be described later and being driven by operation of the internal combustion engine, not shown.

In the second embodiment, the hydraulic pump 23 is in the form of an internal gear pump. Specifically, referring to FIG. 3, the hydraulic pump 23 comprises a pump housing 24 formed with a circular concavity 25, a first gear member 27 having an internal gear 26 on the inner periphery, and a second gear member 29 having an external gear 28 engaged with the internal gear 26 of the first gear member 27, the first and second gear members 27, 29 being rotatably accommodated in the concavity 25 of the pump housing 24.

The pump housing 24 comprises a body **24*a* and a cover, not shown. An intake port 30 and first and second discharge ports 31, 32 have openings in the concavity 25 of the pump housing 24. The intake port 30 is formed in an area where the engaging clearance between the internal gear 26 of the first gear member 27 and the external gear 28 of the second gear member 29 is increased with rotation of the first gear member 27. On the other hand, the first and second discharge ports 31, 32 are formed in an area where the engaging clearance is decreased with rotation of the first gear member 27**.

The second discharge port 32 is formed forwarder than the first discharge port 31 as viewed in the direction of rotation of the hydraulic pump 23 or the first and second gear members 27, 29.

The first gear member 27 is rotatably accommodated in the concavity 25 of the pump housing 24. The internal gear 26 formed on the inner periphery of the first gear member 27 has a profile including a trochoidal curve as a fundamental element and a higher-order functional curve, and covers the overall axial length.

The second gear member 29 is connected to a drive shaft 33, and is slightly eccentrically disposed with respect to the first gear member 27. In the same way as the internal gear 26 of the first gear member 27, the external gear 29 formed on the outer periphery of the second gear member 29 has a profile including a trochoidal curve as a fundamental element and a higher-order functional curve, and covers the overall axial length. The number of teeth of the external gear 28 of the second gear member 29 is 11, which is less than the number of teeth of the internal gear 26 of the first gear member 27 being 12.

An intake passage 35 communicates with the intake port 30 of the hydraulic pump 23. A first discharge passage 36 communicates with the first discharge port 31 of the hydraulic pump 23, and a second discharge passage 37 communicates with the second discharge port 32 of the hydraulic pump 23. The intake passage 35 has an end with an oil strainer 38 to communicate with an oil pan 6. By those, the hydraulic pump 23 can suck hydraulic fluid within the oil pan 6 through the intake passage 35 and the intake port 30 to discharge it not only to the first discharge passage 36 through the first discharge port 31, but the second discharge passage 37 through the second discharge port 32.

The first discharge passage 36 communicates with a main gallery 8 through a filter 7. Hydraulic fluid led to the main gallery 8 is supplied to slide portions 9 of the internal combustion engine for lubrication thereof.

A communication passage 39 ensures communication between the intake passage 35 and the first discharge passage 36. A relief valve 11 is arranged with the communication passage 39 to open it at a predetermined pressure for the first discharge passage 36. Thus, the pressure within the first discharge passage 36 is maintained at a predetermined value by relief action of the relief valve 11.

The second discharge passage 37 communicates with a valve controller 19 of the internal combustion engine through a filter 17. Hydraulic fluid supplied to the valve controller 19 serves to ensure operation thereof.

A communication passage 40 ensures communication between the second discharge passage 37 and the first discharge passage 36. A relief valve 21 is arranged with the communication passage 40 to open it at a predetermined pressure for the second discharge passage 37. Thus, the pressure within the second discharge passage 37 is maintained at a predetermined value by relief action of the relief valve 21.

With such a structure, the hydraulic pump 23 is driven by operation of the internal combustion engine. When the second gear member 29 is rotated clockwise as viewed in FIG. 3 by the drive shaft 33, the hydraulic pump 23 sucks hydraulic fluid within the oil pan 6 through the intake passage 35 and the intake port 30 to discharge it to the first and second discharge passages 36, 37 through the first and second discharge ports 31, 32.

At that time, the hydraulic pump 23 carries hydraulic fluid entering through the intake port 30 by tooth spaces of the internal gear 26 of the first gear member 27 and those of the external gear 28 of the second gear member 29, which is discharged to the first and second discharge ports 31, 32.

Hydraulic fluid discharged from the first discharge port 31 to the first discharge passage 36 is led to the main gallery 8 through the filter 7, which is in turn supplied to the slide portions 9 for lubrication thereof. On the other hand, hydraulic fluid discharged from the second discharge port 32 to the second discharge passage 37 is led to the valve controller 19 through the filter 17 for operation thereof.

When the valve controller 19 is not operated, hydraulic fluid discharged from the second discharge port 32 of the hydraulic pump 23 to the second discharge passage 37 flows into the first discharge passage 36 through the communication passage 40 due to relief action of the relief valve 21.

Thus, the first discharge passage 36 receives a predetermined flow Q1 of hydraulic fluid discharged from the first discharge port 36 and a flow Qa of hydraulic fluid derived from the second discharge passage 37 through the communication passage 40, i.e., a total flow Qt=Q1+Qa. It is noted that when the valve controller 19 is not operated, the flow Qa that the first discharge passage 36 receives through the second discharge passage 37 is substantially equal to a discharge capacity Q2 of the second discharge port 32, since an actuator of the valve controller 19 substantially constitutes a closed circuit.

As a result, hydraulic fluid supplied to the slide portions 9 through the first discharge passage 36 and the main gallery 8 amounts to Qt. It is understood that when the valve controller 19 is not operated, hydraulic fluid discharged from the second discharge port 32 to the second discharge passage 37 is led to the first discharge passage 36, which means that all hydraulic fluid discharged from the hydraulic pump 23 is used effectively.

Moreover, due to effective use of all hydraulic fluid discharged through the first and second discharge ports 31, 32, the hydraulic pump 23 can be reduced in size.

When the valve controller 19 is operated, hydraulic fluid discharged from the second discharge port 32 serves to operate the valve controller 19, which causes a temporary reduction in the flow of hydraulic fluid led to the first discharge passage 36. However, this does not have a substantial influence on lubrication of the slide portions 9, since the operation of the valve controller 19 is completed in a very short time, and the pressure within the first discharge passage 36 returns to a normal value in a short time.

Therefore, the hydraulic circuit can be obtained, which includes the hydraulic pump with saved power and reduced size.

Moreover, the filters 7, 17 arranged in the first and second discharge passages 36, 37 serve to filtrate hydraulic fluid, enabling a supply of clean hydraulic fluid to the slide portions 9 and the valve controller 19.

Moreover, since the hydraulic pump 23 having two discharge ports 31, 32 is in the form of an internal gear pump, wherein the second discharge port 32 is formed forwarder than the first discharge port 31 or the first and second gear members 27, 29, the second discharge port 32 receives higher pressure hydraulic fluid than the first discharge port 31. This enables not only easy allocation of higher pressure hydraulic fluid to the second discharge passage 37 that requires the high pressure for operation of the valve controller 19, but more power saving than when putting all hydraulic fluid discharged from the hydraulic pump 23 at a higher pressure.

Moreover, since the second discharge port 32 is formed forwarder than the first discharge port 31 as viewed in the direction of rotation of the hydraulic pump 23, a pressure rise is faster within the first discharge port 31 than within the second discharge port 32. That is, upon starting of the hydraulic pump 23, the first discharge port 31 receives hydraulic fluid earlier than the second discharge port 32. As a result, when restarting the internal combustion engine, hydraulic fluid is quickly supplied to the slide portions 9 through the first discharge port 31 for lubrication thereof. It is noted that since the valve controller 19 cannot be operated immediately after restarting of the internal combustion engine, a delayed supply of hydraulic fluid to the second discharge port 32 with respect to the first discharge port 31 causes no inconvenience.

Having described the present invention with regard to the preferred embodiments, it is noted that the present invention is not limited thereto, and various changes and modifications can be made without departing from the scope of the present invention. By way of example, in the second embodiment as shown in FIGS. 2–3, the hydraulic pump 23 may include an internal gear pump having a crescent between ring-like outer and inner rotors. Moreover, instead of the gear with a profile including a trochoidal curve, the first and second gear members 27, 29 may be in the form of a gear with a profile including an involute curve or a sine curve, or in the form of a gear-like portion such as a roller.

What is claimed is:

1. A hydraulic circuit for an internal combustion engine, comprising:

first and second pumps;

a main gallery providing hydraulic fluid to a portion of the internal combustion engine that requries lubrication;

a first discharge passage receiving hydraulic fluid discharged from said first pump, said first discharge passage communicating with said main gallery;

a valve controller actuated by receiving hydraulic fluid, said valve controller forming a closed circuit when said valve controller does not to operate;

a second discharge passage receiving hydraulic fluid discharged from said second pump, said second discharge passage communicating with said valve controller;

a communication passage ensuring communication between said first and second discharge passages; and a relief valve arranged with said communication passage, said relief valve being opened at a predetermined pressure in said second discharge passage.

2. A hydraulic circuit as claimed in claim 1, wherein said first and second discharge passages are arranged with filters, respectively.

3. A hydraulic circuit as claimed in claim 2, wherein said communication passage is connected to said first and second discharge passages on the upstream side of said filters.

4. A hydraulic circuit as claimed in claim 1, wherein said first and second pumps are driven by the internal combustion engine.

5. A hydraulic circuit as claimed in claim 1, wherein said relief valve responds to a working pressure which is greater than that required by said valve controller.

6. A hydraulic circuit as claimed in claim 1, wherein said valve controller completes its operation in a very short time.

7. A hydraulic circuit as claimed in claim 1, wherein said relief valve responds to a working pressure which is greater than that required by said valve controller.

8. A hydraulic circuit for an internal combustion engine, comprising:

a pump with first and second discharge ports;

a main gallery providing hydraulic fluid to a portion of the internal combustion engine that requires lubrication;

a first discharge passage receiving hydraulic fluid discharged through said first discharge port of said pump, said first discharge passage communicating with said main gallery;

a valve controller actuated by receiving hydraulic fluid, said valve controller forming a closed circuit when said valve controller does not operate;

a second discharge passage receiving hydraulic fluid discharged from said second discharge port, said second discharge passage communicating with said valve controller;

a communication passage ensuring communication between said first and second discharge passages; and a relief valve arranged with said communication passage, said relief valve being opened at a predetermined pressure in said second discharge passage.

9. A hydraulic circuit as claimed in claim 8, wherein said first and second discharge passages are arranged with filters, respectively.

10. A hydraulic circuit as claimed in claim 9, wherein said communication passage is connected to said first and second discharge passages on the upstream side of said filters.

11. A hydraulic circuit as claimed in claim 9, wherein said second port of said pump is formed forwarder than said first port of said pump as viewed in the direction of rotation of said pump.

12. A hydraulic circuit as claimed in claim 9, wherein said pump includes an internal gear pump.

13. A hydraulic circuit as claimed in claim 8, wherein said pump is driven by the internal combustion engine.

14. A hydraulic circuit as claimed in claim 4, wherein said valve controller completes its operation in a very short time.

* * * * *